United States Patent [19]

Gullett

[11] 3,914,384
[45] Oct. 21, 1975

[54] PRODUCTION OF MONTMORILLONITE MATERIAL HAVING GOOD ENVIRONMENTAL AND ECOLOGICAL PROPERTIES

[75] Inventor: James Thomas Gullett, Houston, Tex.

[73] Assignee: Dresser Industries, Inc., Dallas, Tex.

[22] Filed: Aug. 28, 1974

[21] Appl. No.: 500,807

[52] U.S. Cl. .................... 423/328; 241/4; 241/23; 241/24
[51] Int. Cl.² ........................................ C01B 33/28
[58] Field of Search ............ 241/4, 17, 18, 23, 24, 241/27, 30; 252/449; 106/72, 288 B, 309; 423/118, 328

[56] References Cited
UNITED STATES PATENTS

| | | | |
|---|---|---|---|
| 1,985,526 | 12/1934 | Stockton | 241/23 X |
| 3,408,305 | 10/1968 | Torok | 423/118 X |
| 3,794,251 | 2/1974 | Williams | 241/65 |

*Primary Examiner*—Granville Y. Custer, Jr.
*Attorney, Agent, or Firm*—Raymond T. Majesko; John N. Hazelwood

[57] ABSTRACT

The simultaneous drying and comminuting of raw, as mined, montmorillonite to a discrete particle size predominantly −200 mesh and a Fisher Average Diameter between about 6 and 25 microns in the −200 mesh fraction.

6 Claims, No Drawings

PRODUCTION OF MONTMORILLONITE MATERIAL HAVING GOOD ENVIRONMENTAL AND ECOLOGICAL PROPERTIES

The production of montmorillonites commonly consists of crushing the raw material to a size varying from approximately −1−½ inch to −½ inch in thickness, drying the crushed material in a concurrent rotary dryer to approximately 15% moisture, or 6%, depending upon whether or not flash drying is used and the product, then grinding in a roller mill to the desired fineness.

The procedure is fraught with problems. The primary crushing of wet montmorillonite becomes difficult to obtain a good particle size distribution for drying. The handling of the wet mass creates plugging of the crusher and screen equipment. Montmorillonite dried in conventional dryers, such as the usual rotary dryer, becomes under-fried (large) particles and over-dried (small) particles. Grinding in a Raymond mill of the roller type presents problems of over-grinding. Part of the over-grinding is caused by the internal design of the roller mill. The massive rolls and the hugh support equipment creates so much congestion within the mill, that the static pressure becomes too great for the air system to overcome and cleanly remove particles already ground to the desired fineness. Part of the over-grinding is also caused by the more friable nature of a dried montmorillonite versus a tough wet material.

The bulk loading and bag packing of an over-ground montmorillonite is very difficult because the rate of deaeration is much slower than a product having a uniform particle size distribution.

Montmorillonite is a magnesium clay mineral approximating in composition to 5 $Al_2O_3$. 2 MgO. 24 $SiO_2$. 6 $H_2O$; some of the $H^{2+}$ groups are usually replaced by $Na+$ or by $Ca^{2+}$. Structurally it is composed of units made up of 2 silica tetrahedral sheets with a central alumina octahedral sheet. All of the tips of the tetrahedrons point in the same direction and toward the center of the unit. The tetrahedral and octahedral sheets are combined so that the tips of the tetrahedrons of each silica sheet and one of the hydroxyl layers of the octahedral sheet form a common layer. The atoms common to both the tetrahedral and octahedral layer become O instead of OH. Microscopically, the large masses within the mineral appear to be stackings of flake-shaped units without regular outlines. Some of the individual particles appear to be about 0.002 microns thick, from which it can be concluded that at least some montmorillonites break down relatively easy to flakes approaching unit cell thickness. Pulverized montmorillonite is a mass of mineral fragments strongly bound together when it is dry, but separable when dispersed in water.

Montmorillonite minerals generally have a chemical analyses within the following ranges:

| Chemical Components | Percent Range |
|---|---|
| $SiO_2$ | 50 to 55% |
| $Al_2O_3$ | 15 to 20 |
| $Fe_2O_3$ | 0.05 to 7 |
| FeO | 0 to 1 |
| MgO | 2 to 7 |
| CaO | 0.5 to 4 |
| $TiO_2$ | 0 to .4 |
| Alkalies | 0 to 3 |

It is an object of the present invention to provide a montmorillonite having a particle size much more uniform than heretofore available.

Another object of the invention is to provide a montmorillonite product having improved deaeration properties and density.

In accordance with the present invention, there is provided a process for treating montmorillonite by simultaneously drying and comminuting a raw, as mined, montmorillonite, in its toughest state, having a moisture content of at least about 20% in a single pass through a suitable apparatus to a discrete particle size of predominantly −200 mesh and air classifying said material to provide a Fisher Average Diameter between about 6 and 25 microns.

The actual particle size of the resulting material ranges predominantly uniformly between about 5 and 40 microns. The −200 mesh material ranges between about 70 and 80%, by weight. Attapulgite minerals processed in a similar manner, see U.S. Pat. No. 3,079,333, produced an unpredictable product. Attapulgite, when colloidally dispersed in water or salt solution, thickens the same as a result of the orientation in the vehicle of the colloidal attapulgite needles. Montmorillonite minerals differ from attapulgite in their chemical and physical make-up.

It is considered that to obtain a uniform product, as was obtained with the raw montmorillonite material, in the upper sub-sieve size ranges — a so-called dustless granular material — is completely unexpected with a grind wherein most of the material is comminuted to −200 mesh. It is generally expected that a heterogeneous size gradation would result.

Airborne dust has a particle size of approximately 1 to 3 microns. Montmorillonite material processed according to the invention is substantially free of this dust protecting the environment and workers who handle it.

A montmorillonite processed in the above manner to achieve uniform size gradation and dustless conditions is an asset to the environment and ecology and has a myriad of uses as follows: discovery and recovery of petroleum; refining and preparation of organic materials; pelletizing of ores; water clarification; miscellaneous fillers; foundry sand binder; dessicants, absorbents and molecular sieves; pharmacenticals, cosmetics; soil properties control; active diluent in formulation of insecticides; production of various grades of cement etc.

The montmorillonite is taken from the mine and need not be pre-processed at all except perhaps for a primary grinding to about −1−½ inch or so, if necessary, depending on the drying and grinding apparatus to be employed.

The moist raw feed material is subjected to rapid drying by direct contact with high velocity, hot dry gases simultaneously while comminuting the particles so that drying takes place while fine particles are suspended in a gas (air) which is circulating at high velocity in the dryer. The moist feed is dropped into a stream of hot dry gas and the gas stream carries the feed to a suitable mill and the dried fine particles to a classifier. Good results have been obtained using an Imp mill (a product of Raymond Division, Combustion Engineering, Inc.) or a hammer mill with means to circulate hot air at high velocity through the feed material. In the hammer mill, hammers are mounted to arms which are provided on a shaft adapted to rotate at high speed. The principal action of the mill is one of impact rather than the compression which takes place in roller type mills. Fracture of the feed is also effected in the hammer mill by the rubbing of montmorillonite particles against each other in the rapidly moving gaseous suspension of the particles. These mills contain an internal classification mechanism suitable for the practice of the invention, however, the material can be removed after a single pass and fed to a separate air classifier to obtain higher Fisher Average Diameters. Another apparatus which can be utilized is a cage mill which has rotors concentric with each other and successive rotors are adapted to operate in opposite directions. In such a mill, feed is beaten by the action of bars on rings of the rotors. Other types of grinding mills, provided with means for rapid positive circulation of drying gases, may be used when they are available.

As stated previously, the size reduction in the mill is controlled so that the product is between about 70 to 80% −200 mesh. However, unexpectedly, most of the −200 mesh material has a particle size between about 5 and 40 microns which is considered to be uniform. The Fisher Average Diameter ranges between 6 and 25 microns depending upon the feed material. The present invention is not limited to a 25 micron average diameter, because this is the maximum obtainable with the equipment presently available. A uniform particle size having a Fisher Average Diameter up to about 30 microns would be equally satisfactory.

As mentioned, an important feature of the process of the invention is that rapid drying is effected by the action of hot, high velocity moisture-absorption gases so that drying takes place while particles are gas suspended. Those gases may have velocities of the order of about 50 to 70 feet per second or higher and inlet temperatures between about 200°F. to about 1000°F. The residence period of the feed within the dryer will depend on numerous factors including the mill capacity, gas velocity and temperature and drying efficiency but is of very short duration, generally under a minute. Inasmuch as drying is extremely rapid, the montmorillonite particles do not attain the temperature of the drying gas, and the product temperature in the dryer is well below that at which water of hydration is removed from the mineral lattice, i.e., below about 350°F. and usually from about 100° to 200°F. The gases may be direct or indirect combustion products, the only limitation being that they have the capacity to absorb moisture from the feed and are inert towards the montmorillonite. Dry air is the preferred gas.

The following example illustrates the preparation or treatment of montmorillonite by conventional procedures, viz, drying the raw material in a rotary dryer followed by milling to an appropriate 80% −200 mesh particle size in a Raymond mill of the roller type. The raw material was partially dried in a rotary externally fired dryer having a vent temperature of about 180° to 250°F. The material retention time in the dryer was about 30–40 minutes. The partially dried (15–18% moisture) material was fed to a Raymond roller mill provided with a classifier and was milled and dried simultaneously with hot gases to a fineness such that 70 to 80% was −200 mesh and a moisture of 6 to 10%. The average particle diameter was determined on the dried sample which included the +200 mesh material. On various samples, the Fisher Average Diameter was 3.7, 3.8, 4.0, 4.2 and 4.3 microns. Reducing the moisture content completely in the rotary dryer with no drying during milling gives similar results.

To show the unexpected distinction of the present invention, tests were run on a montmorillonite simple which had a density of 58 pounds per cubic foot and 23% moisture. Sizing of the feed was as follows:

| Fineness | Weight Percent |
|---|---|
| −1 inch + ¾ inch | 0.2% |
| −¾ inch + ½ inch | 2.4 |
| −½ inch + ¼ inch | 14.4 |
| −¼ inch + 6 mesh | 38.8 |
| −6 mesh + 10 mesh | 24.1 |
| −10 mesh + 20 mesh | 4.8 |
| −20 mesh + 40 mesh | 10.0 |
| −40 mesh + 60 mesh | 3.3 |
| −60 mesh + 100 mesh | 1.1 |
| −100 mesh + 200 mesh | 0.5 |
| −200 mesh | 0.2 |

The samples were crushed on a No. 2 Imp dryer mill with four rows of hammers. The venturi was a 12 inch by 14 inch chamber. The mill inlet temperature was about 1200°F. The fans were run at 3480 RPM and the spinner 200 RPM with 16 blades. The grinding data is given in Table I below.

TABLE I

| Sample | A | B | C | D | E | F |
|---|---|---|---|---|---|---|
| Mill (rpm) | 4320 | 4320 | 4320 | 4320 | | 4320 |
| Amps (load) | 21 | 21 | 22 | 20 | | 20 |
| H.P. (load) | 6 | 6 | 6.5 | 5.6 | | 5.6 |
| Venturi Temp. (°F.) | 165° | 230° | 185° | 205° | | 170° |
| Fan Inlet Temp (°F.) | 110° | 130° | 120° | 112° | | 112° |
| Fan Inlet Velocity Pressure (in. H₂O) | 1.1″ | 1.1″ | 1.3″ | 1.9″ | | 1.5″ |
| Static Pressure Mill (in. H₂O) | 0.5″ | .75″ | .75″ | .75″ | | 1.0″ |
| Control Temp. (°F.) | 110° | 150° | 125° | 120° | | 110° |
| Lbs./Hr. of Product | 192 | 228 | 324 | 156 | | 258 |
| Fisher Average Diameter (microns) | 7.3 | 8.5 | 6.8 | 12.0 | 12.5 | 11.5 |
| Product Moisture (%) | 3.8 | 1.2 | 3.9 | 2.2 | 3.3 | 5.0 |

Mix F was further processed by feeding it to a 16 inches Aero Separator (air classifier) at a rate of 64.8 lbs/hr. The fan inlet temperature was 70°F. and speed was 3480 RPM. The spinner speed was 250 RPM. The Fisher Average Diameter of the material was 15 microns.

The rate of deaeration and density is given in Table II below.

TABLE II

| Time (Sec.) | Rate of Deaeration Density (No./Ft.3) | | | | | | Standard Processing |
|---|---|---|---|---|---|---|---|
| | A | B | C | D | E | F | |
| 0 | 37.1 | 38.0 | 35.4 | 44.5 | 44.5 | 45.1 | 33.7 |
| 5 | 39.4 | 39.9 | 37.1 | 45.1 | 45.1 | 45.8 | 36.6 |
| 10 | | 40.5 | 38.0 | | | | 37.9 |
| 15 | | | | | | | 38.9 |
| 20 | | | | | | | 39.9 |
| 30 | | | | | | | 40.5 |

The above results are significant in showing that the dustless material of the invention can be packed and packaged more rapidly than the standard material.

It is intended that the foregoing description be construed as illustrative and not in limitation of the invention.

Having thus described the invention in detail and with sufficient particularity as to enable those skilled in the art to practice it, what is desired to have protected by Letters Patent is set forth in the following claims.

The embodiments of the invention in which an exclusive property of privilege is claimed are defined as follows:

1. A process for treating montmorillonite to improve its particle size uniformity and density comprising simultaneously drying and comminuting raw, as mined, montmorillonite, having a moisture content of at least about 20% in a single pass through a suitable apparatus to a discrete particle size predominantly −200 mesh and air classifying said material to provide a Fisher Average Diameter between about 6 and 25 microns.

2. A process according to claim 1 in which the particle size ranges predominantly between about 5 and 40 microns.

3. A process according to claim 1 in which the −200 mesh material ranges between about 70 and 80%.

4. A process according to claim 1 in which the montmorillonite is dried by suspension in high velocity gases at a temperature from about 200°F. to 1000°F. for a period of up to about 1 minute.

5. A product produced in accordance with the method of claim 1.

6. A process according to clam 1 in which the material is air classified a second time to increase its Fisher Average Diameter.

* * * * *